United States Patent

Hand et al.

[11] Patent Number: 6,111,195
[45] Date of Patent: Aug. 29, 2000

[54] COMMUNICATIONS CABINET AND MOUNTING SYSTEM

[75] Inventors: R. Scott Hand, Kentwood; Robert H. Greenhoe, Ada; Todd C. Fitzpatrick, Grands Rapids, all of Mich.; James L. Kraft, York, Pa.; Jared Alden Judson, Cambridge, Mass.; Karl J. Mead, Grand Rapids; Kevin M. Stanley, Caledonia, both of Mich.

[73] Assignee: Steelcase Inc., Grand Rapids, Mich.

[21] Appl. No.: 09/231,348

[22] Filed: Jan. 13, 1999

[51] Int. Cl.[7] ........................................................ H02G 3/04
[52] U.S. Cl. ............................... 174/48; 174/49; 174/58; 52/220.7; 439/215
[58] Field of Search ............................... 174/48, 49, 52.4, 174/53, 57, 58; 52/220.2, 220.7, 239; 361/826, 827; 439/215; 312/198

[56] References Cited

U.S. PATENT DOCUMENTS

| | | |
|---|---|---|
| 3,152,219 | 10/1964 | Murray et al. . |
| 3,182,946 | 5/1965 | Dudko . |
| 3,199,068 | 8/1965 | Neenan . |
| 3,445,585 | 5/1969 | Meisel et al. . |
| 3,856,981 | 12/1974 | Boundy . |
| 3,948,581 | 4/1976 | Helman et al. ........................... 312/198 |
| 3,991,264 | 11/1976 | Connell . |
| 4,053,719 | 10/1977 | Debortoli et al. . |
| 4,073,455 | 2/1978 | Gunther . |
| 4,146,281 | 3/1979 | Quartarone . |
| 4,232,183 | 11/1980 | Person ......................................... 174/48 |
| 4,371,757 | 2/1983 | Debortoli et al. . |
| 4,378,727 | 4/1983 | Doss ......................................... 454/251 |
| 4,479,030 | 10/1984 | Votteler et al. . |
| 4,546,590 | 10/1985 | Finch et al. ............................... 52/520 |
| 4,641,225 | 2/1987 | Reichle . |
| 4,654,756 | 3/1987 | Wilson et al. . |
| 4,675,900 | 6/1987 | Temkin . |
| 4,729,064 | 3/1988 | Singer, Jr. . |
| 4,929,192 | 5/1990 | Beghelli . |
| 5,013,112 | 5/1991 | Hellwig ..................................... 385/147 |
| 5,014,164 | 5/1991 | Casa et al. . |
| 5,018,052 | 5/1991 | Ammon et al. . |

(List continued on next page.)

OTHER PUBLICATIONS http://www.siemon.com/cgi–bin/SiemonCatalog.exe, visited Jun. 30, 1999, e–catalog, cable management accessories, showing "Panel Access Hinge," Part # PH–3.
Panduit Corp, 1995 Wiring and Communication Products Catalog, showing "Panduct Wiring Duct," on pp. 44 and 45. No Date.

*Primary Examiner*—Kristine Kincaid
*Assistant Examiner*—Dhiru R Patel
*Attorney, Agent, or Firm*—Foley & Lardner

[57] ABSTRACT

A communication cable management and distribution system for use in a modular partitioned workspace environment including a plurality of partition panels defining the workspaces and a consolidation point cabinet mounted on and supported by the partition structure. The cabinet is generally rectangular and includes an interior defined by a top, a bottom, a back, a pair of sides and a front. The cabinet is mounted on the partition structure by mounting brackets which are configured so that the cabinet can only be unmounted from the partition structure by gaining access to the cabinet interior. A back wall in the cabinet interior includes a plurality of apertures which allows cable management elements to be mounted by screws at a plurality of interchangeable locations. One such cable management element is a consolidation point bracket that is pivotable between a first position for storage and a second position offering improved access to the consolidation point. The cabinet includes a back double wall which increases the strength of the cabinet and allows an area for the screws to terminate internally of the cabinet. A method of mounting the cabinet on the partition structure is also disclosed. The method includes securing a first mounting bracket to a first vertical frame member of the partition structure, hanging the cabinet on the first mounting bracket so that the cabinet is supported thereby, and locking the cabinet to the first mounting bracket.

53 Claims, 7 Drawing Sheets

U.S. PATENT DOCUMENTS

| | | |
|---|---|---|
| 5,044,135 | 9/1991 | Kroon et al. . |
| 5,070,429 | 12/1991 | Skirpan . |
| 5,081,560 | 1/1992 | Donnerstag . |
| 5,122,069 | 6/1992 | Brownlie et al. . |
| 5,169,221 | 12/1992 | Wheeler . |
| 5,195,286 | 3/1993 | DeLong et al. . |
| 5,214,889 | 6/1993 | Nienhuis et al. . |
| 5,219,443 | 6/1993 | Stoerk et al. . |
| 5,277,006 | 1/1994 | Ruster . |
| 5,303,320 | 4/1994 | Duffie ................................... 385/135 |
| 5,318,259 | 6/1994 | Fussler . |
| 5,326,934 | 7/1994 | LeMaster et al. . |
| 5,328,260 | 7/1994 | Beirise . |
| 5,370,553 | 12/1994 | Zimmerman . |
| 5,396,405 | 3/1995 | Reed et al. . |
| 5,473,994 | 12/1995 | Foley et al. ........................ 108/50.02 |
| 5,486,041 | 1/1996 | Sykes ..................................... 312/111 |
| 5,516,298 | 5/1996 | Smith . |
| 5,548,086 | 8/1996 | Greenfield et al. . |
| 5,548,489 | 8/1996 | Reed et al. . |
| 5,574,251 | 11/1996 | Sevier . |
| 5,626,404 | 5/1997 | Kelley et al. . |
| 5,639,261 | 6/1997 | Rutkowski et al. . |
| 5,660,120 | 8/1997 | Sims . |
| 5,672,845 | 9/1997 | Greenfield et al. . |
| 5,675,194 | 10/1997 | Domigan . |
| 5,685,113 | 11/1997 | Reuter et al. ......................... 52/220.7 |
| 5,747,734 | 5/1998 | Kozlowski et al. . |
| 5,831,211 | 11/1998 | Gartung et al. . |
| 5,831,814 | 11/1998 | Hamill . |

COMMUNICATIONS CABINET AND MOUNTING SYSTEM

FIELD OF THE INVENTION

The present invention relates to a communications cabinet and an associated mounting system. More particularly, the invention relates to a communication cabling cabinet configured to be mounted on and supported by a modular office partition structure to provide the cabling system with improved cable management, security, accessibility and reconfigurability.

BACKGROUND OF THE INVENTION

Communication cabling systems are used to transmit data and voice signals to and from the modular offices or workstations of an open office environment. Such cabling systems communicate between a distribution block or patch panel located in a computer room or telecommunication closet and various telecommunication devices located at the workstations such as telephones, facsimile machines and computers.

Cabling systems for open office environments in which modular office partitions are used to form the workstations have traditionally comprised individual cables extending uninterrupted from the wiring closet all the way to the workstation devices. These systems are known as a "home run" cabling systems. More recently, it has become common to use what is known as "modular" cabling systems in open office environments. Modular cabling systems include at least one cable consolidation point (CP) located intermediate the closet and the workstation devices, sometimes located directly adjacent the workstations served by the CP. Modular cabling systems offer the important advantage of simplifying moves, adds and changes to the cabling extending to the workstation devices because there is no need to reconfigure or disturb the cables extending from the CP back to the wiring closet. Instead, only the cables "downstream" of the CP may need to be reconfigured. Another important advantage of modular cabling systems is that because the cables extending between the wiring closet and the CPs are run in "multiple" (i.e., provide capability for two or more users or devices), there are less cable runs into the wiring closet, which decreases cable congestion.

Although some CP cabinets designed for placement relatively near the workstations are known, these cabinets are typically free standing or supported on the floor adjacent a partition element. As such, the CP cabinets can take up valuable floor space and, in addition, are often not well visually integrated into the partition system. Another drawback of known CP cabinets is that even when they include a lockable door, cable passage apertures in the sides or backs of the cabinets can be exposed and thereby create a security risk. It would be desirable to provide a local CP cabinet which is mounted on and visually integrated into the office partition structure. It would also be desirable to provide a local CP cabinet with enhanced security features.

SUMMARY OF THE INVENTION

The present invention relates to a communication cable management and distribution system for use in a modular partitioned workspace environment. The system comprises a plurality of partition panels defining the workspaces, and a communication cabling consolidation point cabinet mounted on at least one of the panels so that it is at least partially supported thereby. The cabinet is generally rectangular and includes an interior defined by a top, a bottom, a back, a pair of sides and a front.

According to one aspect of the present invention, the back includes a double wall.

A different aspect of the present invention is that the cabinet includes means for preventing the cabinet from being unmounted from the at least one of the panels except by gaining internal access to the cabinet.

Another aspect of the present invention is that a bracket assembly is mounted in the interior of the cabinet for supporting a communication cabling consolidation point. The bracket assembly includes a support bracket that is pivotable between at least two positions including a first position for storage and use and a second position offering improved access to a front or rear of the consolidation point.

A further aspect of the invention is that a cable management element is mounted in the interior of the cabinet. The interior of the cabinet and the cable management element are configured such that the cable management element can be mounted at a plurality of interchangeable locations in the interior of the cabinet.

The invention also relates to method of mounting a consolidation point cabinet on a modular office partition structure. The cabinet is generally rectangular and includes a top, a bottom, a back, a pair of sides and a front. The method comprises the steps of securing a first mounting bracket to a first vertical frame member of the partition structure, hanging the cabinet on the first mounting bracket so that the cabinet is at least partially supported thereby, and locking the cabinet to the first mounting bracket.

DETAILED DESCRIPTION OF THE PREFERRED EMBODIMENTS

Figure 1:
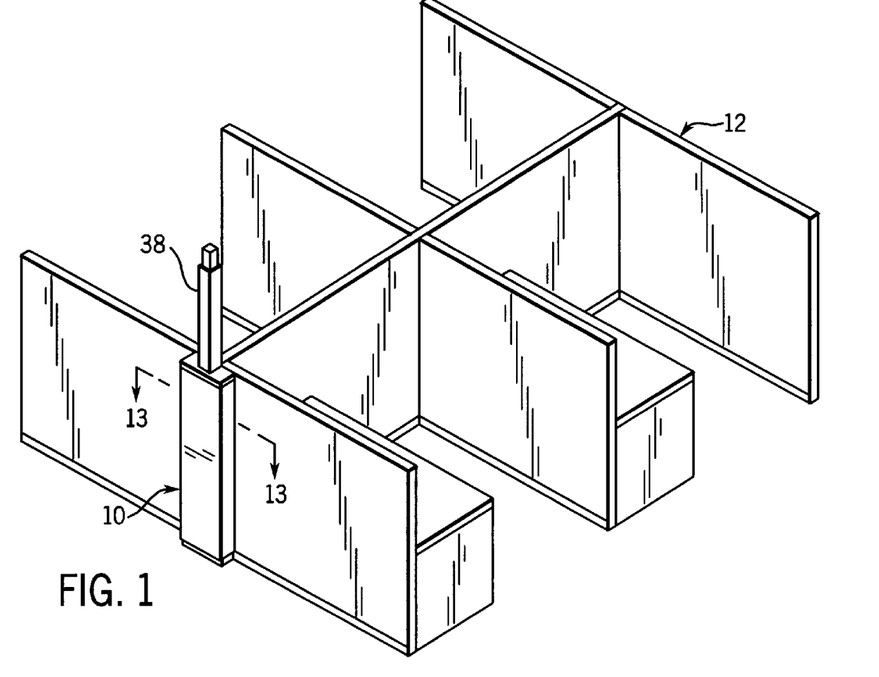
FIG. 1 is a perspective view of a cabling consolidation point cabinet mounted on a partition structure in accordance with the present invention.

As shown in FIG. 1, the invention relates to a cabling consolidation point cabinet 10 and an associated mounting system. Cabinet 10 provides an enclosure for the routing and consolidation of communication cabling to and from a cluster of workstations defined by a partition structure 12.

Figure 2:
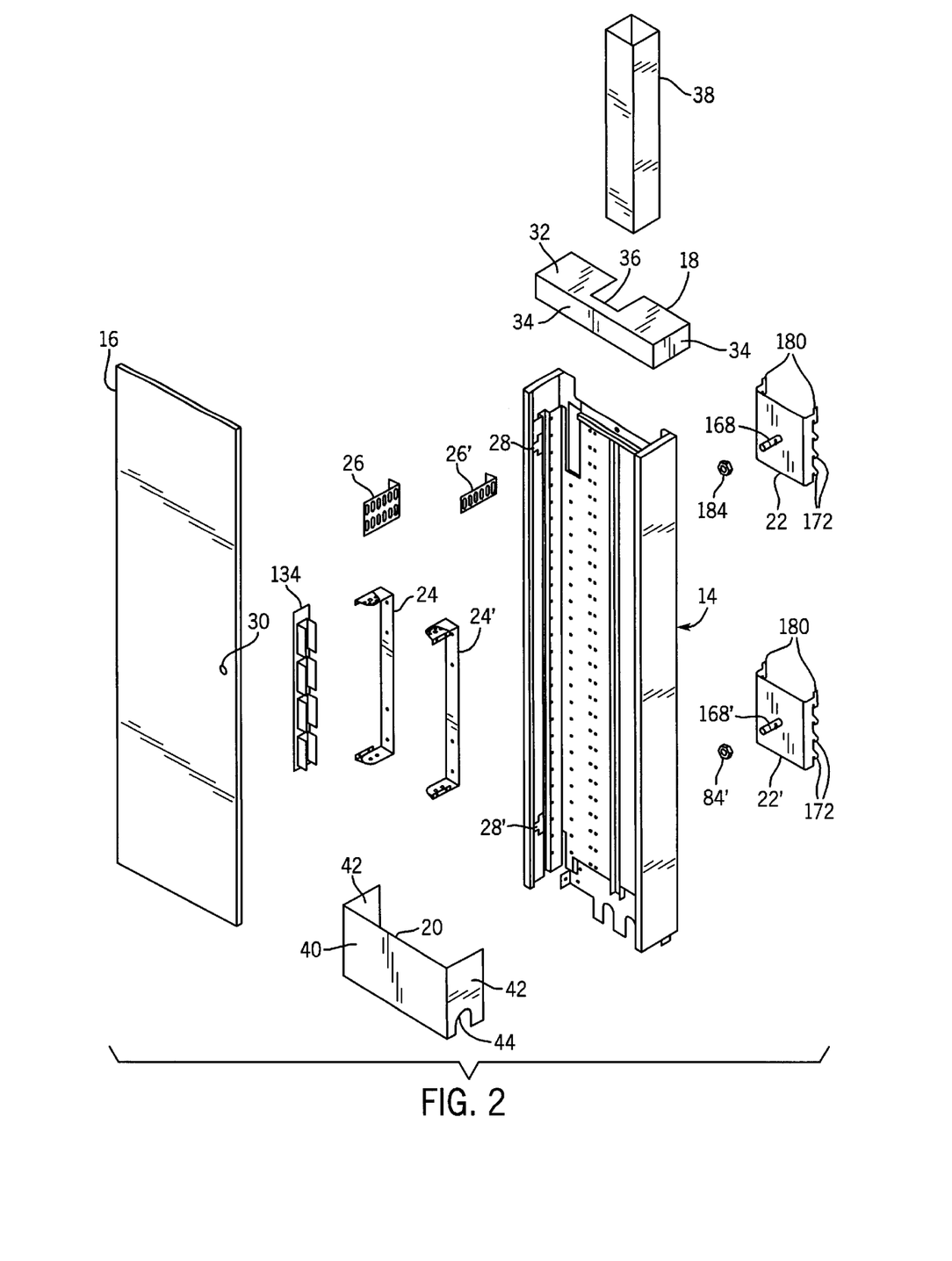
FIG. 2 is an exploded perspective view of the cabling consolidation point cabinet of FIG. 1, showing an exemplary structure of the cabinet and the cable management elements.
Figure 3:
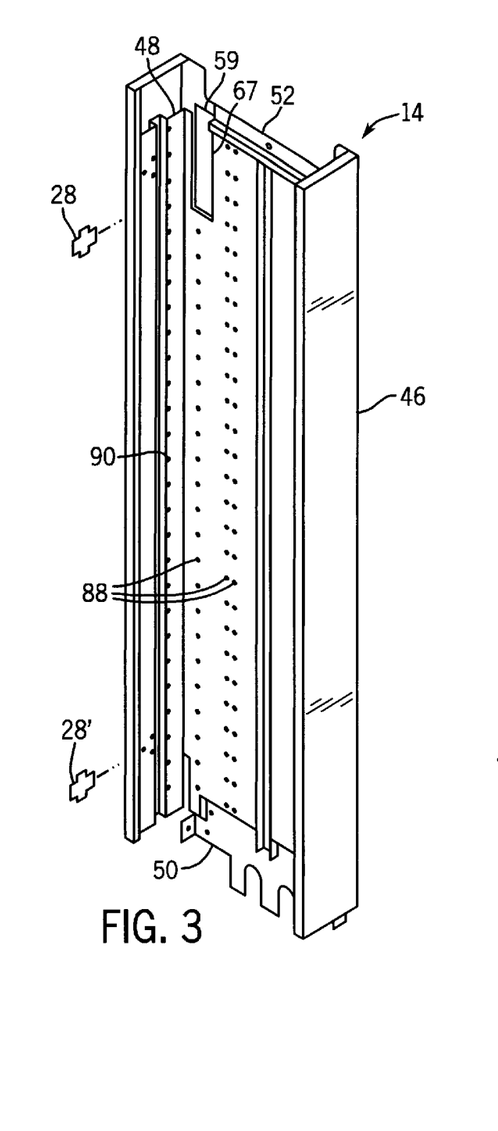
FIG. 3 is an enlarged perspective view of the body assembly weldment of the consolidation point cabinet.

Turning now to FIG. 2, cabinet 10 comprises a body assembly 14, a door assembly 16, a top cap 18, a base cover 20, cabinet mounting bracket assemblies 22, 22', consolidation point (CP) mounting bracket assemblies 24, 24', and dividers 26, 26'. As will be further explained below, body assembly 14 preferably comprises a weldment of numerous parts including, in the illustrated embodiment, hinges 28, 28' for supporting door 16 for pivotal movement between an open and a closed position. Door 16 may be reversible so that it can be hinged to cabinet 10 along either side, or it could comprise double doors hinged to both sides of cabinet 10. Another possibility is that door 16 could be fully removable (e.g., a snap-in door or a door which hangs on frame elements) and not use any hinges at all. However constructed, door 16 preferably includes a lock 30 for restricting access.

Top cap 18 has a generally rectangular top wall 32 and four side walls 34, any of which may include a cutout 36 for allowing passage of a power or utility pole 38 into cabinet 10 (see FIG. 1). Base cover 20 includes a front wall 40 and a pair of side flaps 42, any of which may include a cutout 44 for allowing passage of power or communication cabling (not shown) to and from cabinet 10. Base cover 20 is preferably attached to body assembly 14 in a manner that allows it to be adjusted up and down so it can be aligned flush with the bottom edge of partition structure 12. The base cover could also be configured to run inside cabinet 10 such that it rides or mounts to the floor. Preferably, top cap 18 and base cover 20 are easily removable to provide cabinet 10 with "lay-in" cable capability.

Figure 4:
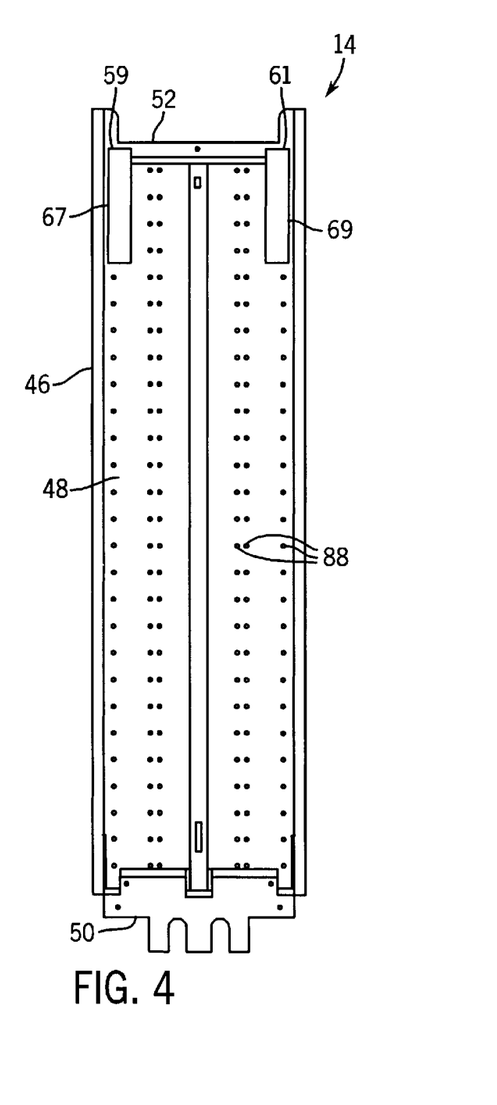
FIG. 4 is a front elevation view of the body assembly weldment of the consolidation point cabinet.
Figure 5:
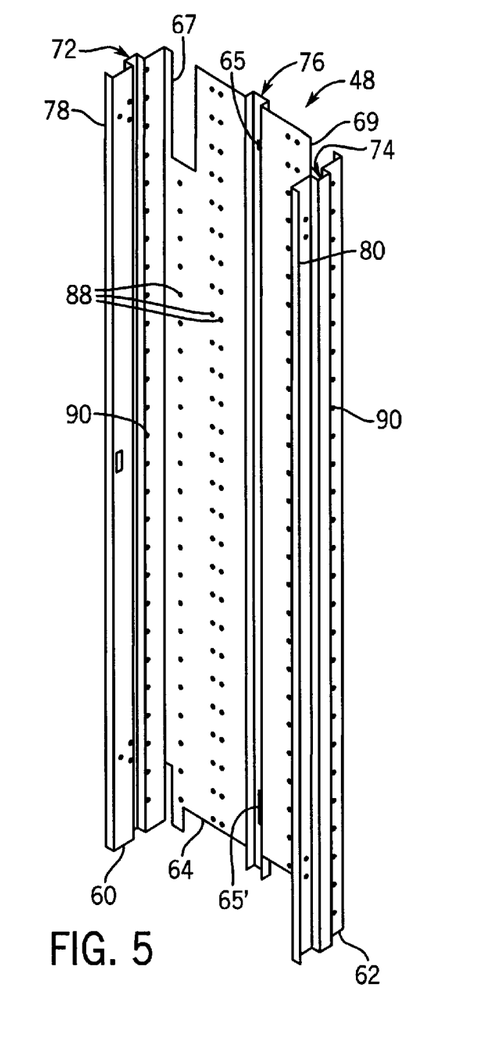
FIG. 5 is a perspective view of an inner stiffener of the cabinet body assembly weldment.
Figure 6:
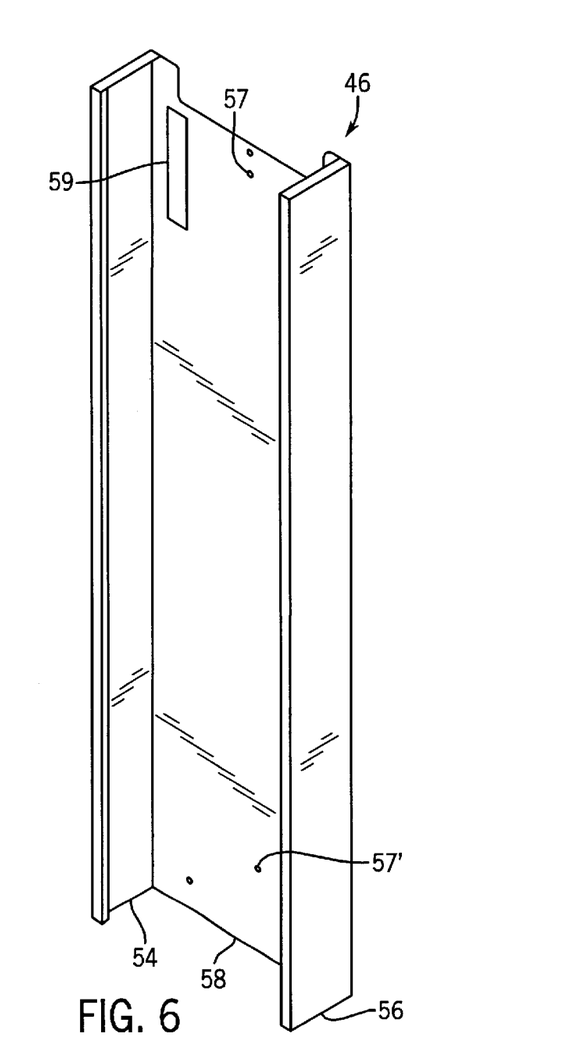
FIG. 6 is a perspective view of an outer shell of the cabinet body assembly weldment.
Figures 7, 8:
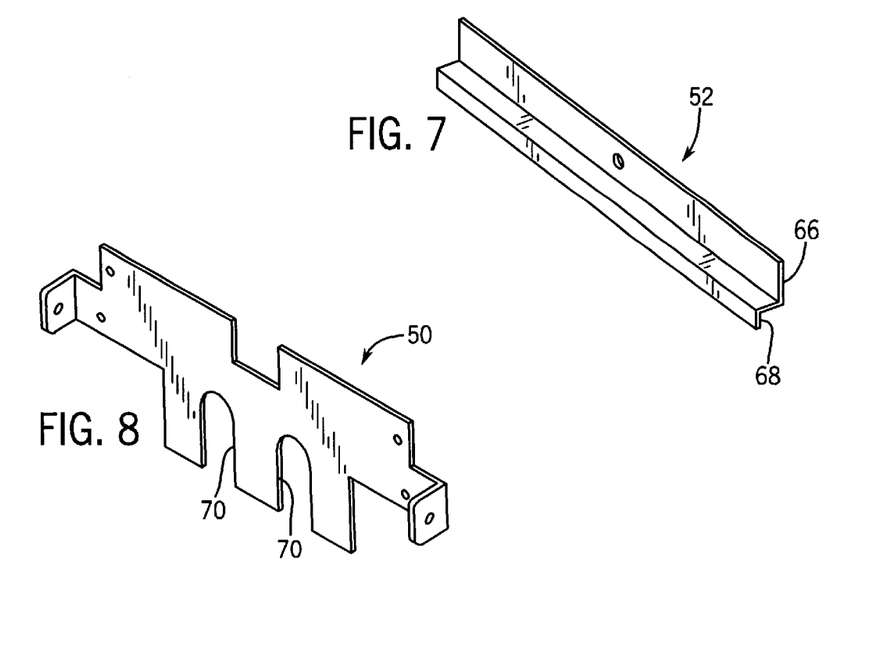
FIG. 7 is an enlarged perspective view of a reinforcing bracket of the cabinet body assembly weldment that spans the upper edges of the inner stiffener and outer shell shown.
FIG. 8 is an enlarged perspective view of a strain relief bracket of the cabinet body assembly weldment.

Referring now to FIGS. 3–8, the weldment of body assembly 14 includes an outer shell 46, an inner stiffener 48, a strain relief bracket 50, a retainer bracket 52, a hinge reinforcement plate (not shown), and hinges 28, 28'. As best seen in FIG. 6, shell 46 comprises a metal plate which is bent to include a pair of side walls 54 and 56 extending along opposite edges of a back wall 58. Back wall 58 of shell 46 includes upper and lower cabinet mounting holes 57 and 57', respectively, and may also include cabling passage cutouts 59 and 61 (see FIG. 4). As best seen in FIG. 5, stiffener 48 comprises a metal plate which is similarly bent to include a pair of side walls 60 and 62 extending along opposite edges of a back wall 64, and to fit closely within the inner surfaces of respective walls 54, 56 and 58 of shell 46. As with back wall 58 of shell 46, back wall 64 of stiffener 48 includes upper and lower cabinet mounting apertures 65 and 65', respectively, and may also include cabling passage cutouts 67 and 69. When body assembly 14 is assembled, upper and lower mounting apertures 57 and 57' in stiffener 48 align with respective upper and lower mounting apertures 65 and 65' in shell 46, and cutouts 59 and 61 in stiffener 48 align with cutouts 67 and 69 in shell 46. As best seen in FIG. 7, retainer bracket 52 comprises a Z-shaped metal plate which spans the upper edges of shell 46 and stiffener 48. Retainer bracket 52 reinforces body assembly 14 by including a vertically extending upper flange 66 secured to back wall 58 of shell 46 and a vertically extending lower flange 68 secured to back wall 64 of stiffener 48. Strain relief bracket 50 comprises a metal plate located at the bottom of stiffener 48. As best seen in FIG. 8, strain relief bracket 50 includes a pair of downwardly opening slots 70 which are used to provide strain relief for electrical cables. Although the above described elements are preferably part of the weldment of body assembly 14, any or all of them could be separate elements secured together by screws or the like and thus change with the specifics of the installation.

Figure 13:
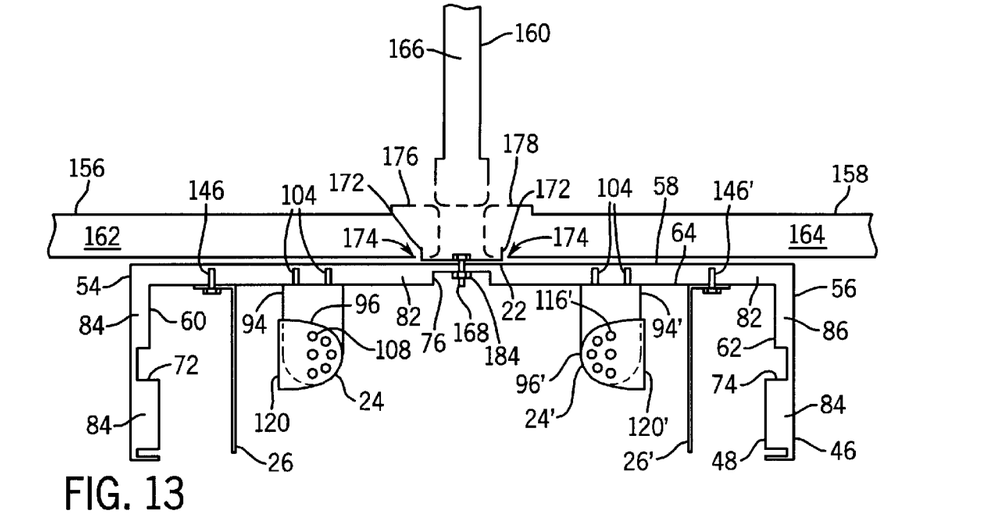
FIG. 13 is a top plan schematic representation of the cabling consolidation point cabinet shown mounted at a T-juncture of three panels in the partition structure of FIG. 1 taken along the line 13—13.

As best seen in FIGS. 5 and 13, each wall 60, 62 and 64 of stiffener 48 preferably includes a centrally located and vertically extending channel 72, 74 and 76, respectively, which defines the desired spacing between shell 46 and stiffener 48 and also increases the structural rigidity of body assembly 14. In addition, the front edge of each side wall 60 and 62 of stiffener 48 preferably includes an outwardly extending flange 78 and 80, respectively, which also defines the desired spacing. With this spaced arrangement, it can be seen that gaps 82 are provided between opposing faces on back wall 58 of shell 46 and back wall 64 of stiffener 48 (see FIG. 13). Similarly, it can be seen that gaps 84 are provided between opposing faces on side wall 54 of shell 46 and side wall 60 of stiffener 48, and that gaps 86 are provided between opposing faces on side walls 56 of shell 46 and side wall 62 of stiffener 48.

As best seen in FIG. 4, back wall 64 of stiffener 48 includes a plurality of identical apertures 88 which provide interchangeable positions at which various types of cable management elements can be adjustably mounted (i.e., at various locations and orientations) inside cabinet 10. Preferably, side walls 60 and 62 of stiffener 48 also include a plurality of identical apertures 90 (see FIG. 5) that provide additional interchangeable positions for mounting cable management elements inside cabinet 10. In the illustrated embodiment, apertures 88 and 90 are arranged in a number of vertically extending rows (i.e., columns).

Figure 9:
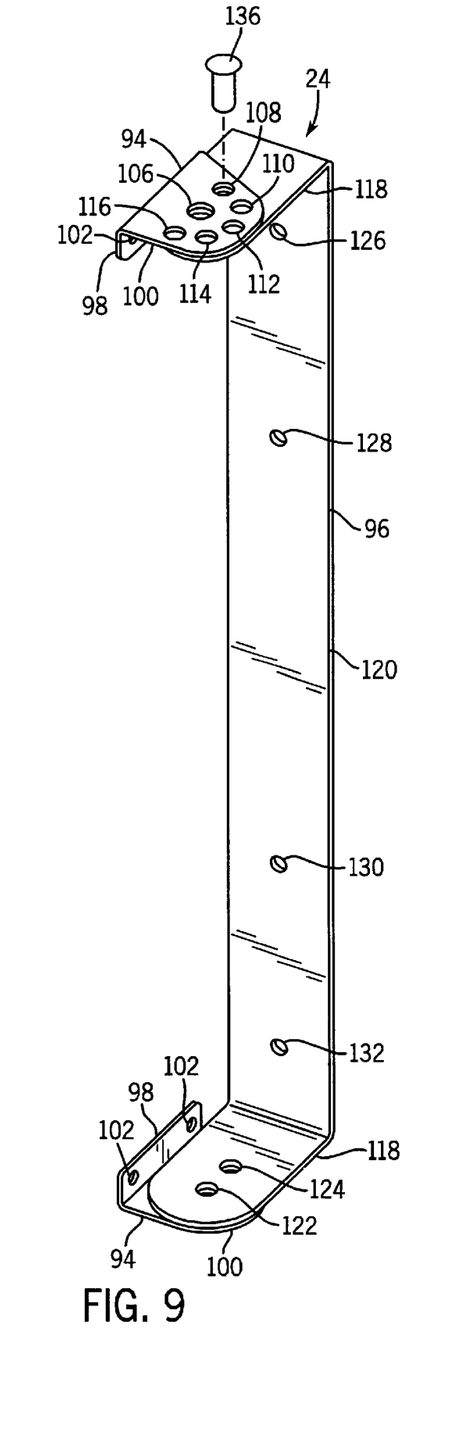
FIG. 9 is an enlarged perspective view of a consolidation point mounting bracket as shown in FIG. 2.
Figure 10:
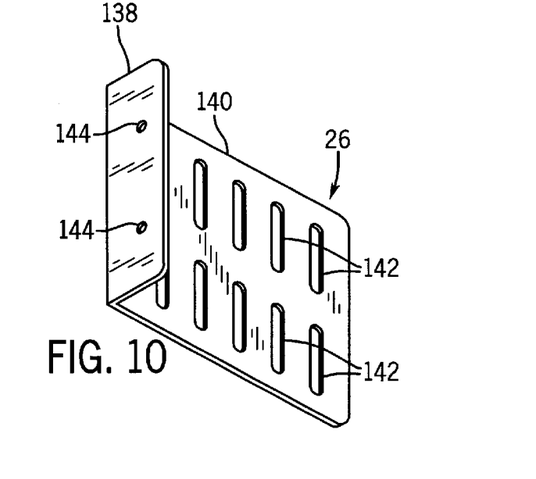
FIG. 10 is an enlarged perspective view of a divider bracket as shown in FIG. 2.
Figure 11:
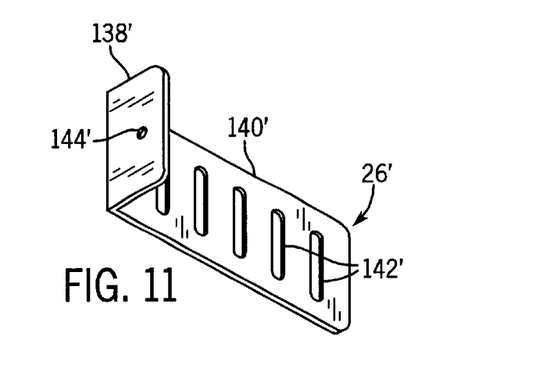
FIG. 11 is a perspective view of a second embodiment of a divider bracket.
Figure 12:
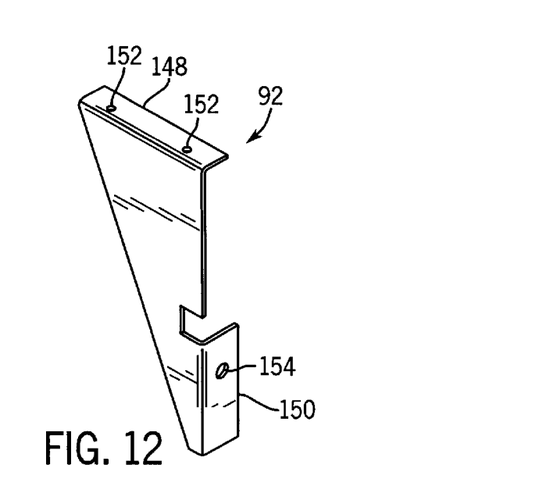
FIG. 12 is a perspective view of a power pole mount.

Turning now to FIGS. 9–12, several types of cable management elements are illustrated, each of which can be adjustably mounted inside cabinet 10. In particular, FIG. 9 shows CP mounting bracket assembly 24, FIGS. 10 and 11 show dividers 26 and 26', respectively, and FIG. 12 shows a power pole bracket 92.

As best seen in FIG. 9, CP mounting bracket assembly 24 comprises three main pieces, namely, a pair of end brackets 94 which support an intermediate bracket 96 for relative pivotal movement. Each end bracket 94 is a generally L-shaped metal plate which includes a base portion 98 and an arm portion 100. Base portion 98 includes a pair of apertures 102 through which sheet metal screws 104 (see FIG. 13) may extend for anchoring bracket 94 to stiffener 48. Arm portion 100 includes a centrally located pivot hole 106 and a plurality of stop holes 108–116. Stop holes 108–116 are preferably located in arm portion 100 at radially equally spaced positions around a semicircle of pivot hole 106 opposite base portion 98.

Intermediate bracket 96 is an elongated U-shaped metal plate which includes a pair of leg portions 118 extending from opposite edges of an elongated spanning portion 120. Each leg portion 118 includes a centrally located pivot hole 122 and a stop hole 124 which is offset towards spanning portion 120. Spanning portion 120 includes a plurality of apertures 126–132 that are sized and positioned as appropriate for whatever type of cable consolidation point 134

(see FIG. 2) will be used. For example, if consolidation points 134 will comprise devices known as "24 patch port panels", which are typically 19 inch tall, then apertures 126, 128, 130 and 132 are preferably spaced apart by distances of 4 inches, 8 inches, and 4 inches, respectively. As another example, if consolidation points 134 will comprise devices known as "110 punch down blocks", then spanning portion 120 will be provided with holes that are 5.6 inches apart.

Still referring to FIG. 9, CP mounting bracket assembly 24 is assembled by aligning pivot holes 122 in leg portions 118 of intermediate bracket 96 with pivot holes 106 in arm portions 100 of associated end brackets 94, and by inserting a suitable fastening means (e.g., a nut and bolt) through each pair of aligned pivot holes 122 and 106. With this arrangement, intermediate bracket 96 can be readily pivoted between opposed storage positions as shown in FIG. 13. More particularly, FIG. 13 shows CP bracket assembly 24 oriented in a first storage position in which spanning portion 120 is closest to side wall 60 and stop hole 124 in pivotable intermediate bracket 96 is aligned with stop hole 108 in end bracket 94. FIG. 13 shows CP bracket assembly 24' in the opposed storage position (i.e., rotated 180° opposite the first position) in which spanning portion 120' is closest to side wall 62 and stop hole 124' in pivotable intermediate bracket 96' is aligned with stop hole 116' in end bracket 94'. In either storage position, a headed pins 136 (see FIG. 9), cotter pin or the like can be inserted through the aligned stop holes to lock bracket assemblies 24 and 24' in place. In addition, intermediate bracket 96 can be rotated to any desired orientation between the opposed storage positions to obtain better access to the front or rear of consolidation points 134. Again, pin 136 can be inserted through the stop hole 124 when aligned with any one of stop holes 110, 112 or 114 to lock bracket assembly 24 in the desired position.

With reference to FIGS. 10 and 11, each divider 26, 26' is seen to comprise a generally L-shaped metal plate including a respective base portion 138, 138' and a respective finger portion 140, 140'. Each finger portion 140, 140+ preferably includes a plurality of apertures 142, 142' which allow for twist-ties, zip ties, or VELCRO strips to be used to group the cables and tie them off for strain relief. Base portion 138 of divider 26 (see FIG. 10) includes a pair of apertures 144, while base portion 138' of divider 26' (see FIG. 11) includes only a single aperture 144'. Thus, divider 26 is secured in place by a pair of sheet metal screws 146 (see FIG. 13) which extend into and threadedly engage apertures 90 in stiffener 48, while divider 26' is secured to stiffener 48 by only a single sheet metal screw 146' (see FIG. 13). With this arrangement, divider 26' can be swiveled into any desired orientation (which may be desirable for some applications) by first loosening screw 146', then rotating divider 26', and then retightening screw 146'.

As best seen in FIG. 12, power pole bracket 92 comprises a generally triangularly shaped metal plate including a horizontally extending and upwardly facing shoulder 148 extending along the base of the triangle and a vertically extending and rearwardly facing flange 150 adjacent the tip of the triangle. Shoulder 148 preferably includes a pair of apertures 152 through which screws or bolts may be extended to secure power pole 38 in place. Flange 150 includes an aperture 154 through which a sheet metal screw may extend to anchor bracket 96 to stiffener 48. Normally, a pair of brackets 92 would be used to bottom out (i.e., bear the weight of) power pole 38.

With reference now to FIG. 13, it can be seen that the spacing between shell 46 and stiffener 48 defined by channels 72–76 provides body assembly 14 with a double walled structure. This double wall structure of body assembly 14 provides a number of distinct advantages in cabinet 10. First, the double wall structure provides cabinet 10 with improved rigidity and strength, yet it remains light in weight. Second, the double wall structure also provides cabinet 10 with enhanced security. In particular, the double wall structure provides a protected area (i.e., gaps 82–86) inside cabinet 10 in which the screws securing the cable management elements can terminate without protruding out the back of cabinet 10. Thus, screws 104, 146 and 146' securing cable management elements 24, 24', 26 and 26' in place can only accessed through the lockable front door 16, which improves security in cabinet 10. Third, the sharp points of the screws cannot damage any equipment or furniture components located near the back of cabinet 10.

Figure 14:
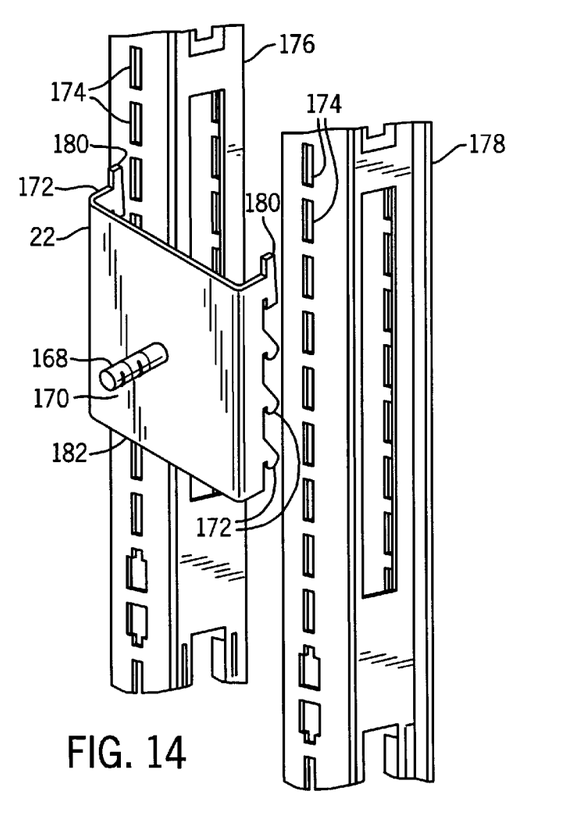
FIG. 14 is a perspective view showing a cabinet mounting bracket aligned with the vertical frame members to two adjacent panels in the partition structure.

Referring now to FIGS. 1, 13 and 14, cabinet 10 is shown mounted on the side of modular office partition structure 12. More precisely, cabinet 10 is shown mounted in a hanging arrangement at a T-juncture of three panels 156, 158 and 160 of partition structure 12, which preferably bears the entire weight of cabinet 10. The T-juncture location of partition structure 12 is advantageous in that cabling can be routed out the back of cabinet 10 into raceways 162, 164 and 166 without having to cut or mar the panel covers. Of course, where there is no concern with cutting the panel covers, or where the cabling will extend into the panels of the partition structure 12 from the top, cabinet 10 can be mounted on partition structure 12 at a number of other suitable locations.

Cabinet 10 is secured to partition structure 12 by means of upper and lower mounting brackets 22 and 22', respectively (see FIG. 2). As best seen in FIGS. 13 and 14, mounting bracket 22 is a generally U-shaped metal plate that is attached to cabinet 10 and partition structure 12. Mounting bracket 22 includes a forwardly projecting threaded stud 168 (or bolt) located a center plate 170 of bracket 22. Mounting bracket 22 also includes two columns of rearwardly and downwardly projecting tabs 172 located along opposite side edges of center plate 170. The two columns of tabs 172 are configured to extend into and interlock with two columns of complementary vertical slots 174 provided in vertical frame members 176 and 178 of respective partition panels 156 and 158. Preferably, the two columns of vertical slots 174 are preexisting in frame members 176 and 178. For example, in the illustrated embodiment slots 174 are provided in frame member 176 and 178 for securing covers to panels 156 and 158. The use of preexisting slots for mounting cabinet 10 to partition structure 12 simplifies the manufacturing requirements of panels 156 and 158 because there is no need to form any additional slots in the frame members of the panels.

As best seen in FIG. 14, the uppermost tab in each column of tabs 172 preferably includes an upwardly extending projection 180, which provides mounting bracket 22 with an anti-dislodgment feature. Mounting bracket 22 provided with this feature can only be attached to partition structure 12 by the following procedure. First, bracket 22 is tilted at an angle relative to vertical frame members 176 and 178 (i.e., so that a bottom edge 182 of bracket 22 is farthest from frame members 176 and 178), which allows upwardly extending projections 180 on the uppermost tabs 172 to be inserted into the associated slots 174. Next, bracket 22 is rotated into a vertical position (i.e., so that center plate 170 is parallel with frame members 176 and 178), which allows the remaining tabs 172 to be inserted into the associated slots 174. Finally, bracket 22 is slid downwardly until tabs 172 are fully seated against the lower edges of slots 174, at which point bracket 22 is firmly secured to frame members 176 and 178. Mounting bracket 22 can only be removed from frame members 176 and 178 by reversing the foregoing steps.

Once upper and lower mounting brackets 22, 22' are firmly secured to frame members 176 and 178 of partition structure 12 by the above-described procedure, cabinet 10 can then be secured over the forwardly projecting studs 168, 168' provided by upper and lower mounting brackets 22, 22'. More particularly, stud 168 can be extended through the aligned upper mounting apertures 57 and 65 in respective back walls 58 and 64 of cabinet 10, and stud 168' can be extended through lower mounting apertures 57' and 65' in respective back walls 58 and 64 of cabinet 10. Cabinet 10 can then be securely locked to mounting brackets 22 and 22' by threading nuts 184, 184' over the ends of studs 168, 168'.

With the above-described mounting system, it should be clear that cabinet 10 cannot be removed from partition structure 12 except by gaining access to the inside of cabinet 10, i.e., so that nuts 184, 184' can be removed. That is, although each mounting bracket 22, 22' can be independently removed from vertical frame members 176, 178 by separately tilting or rotating each bracket 22, 22' about its uppermost tabs, it is impossible to tilt brackets 22, 22' in this manner when they are coupled to cabinet 10. Thus, unlike known cabinet structures and attachment methods, cabinet 10 is better protected against unauthorized access because any cable passage cutouts in the back of cabinet are only exposed if access can be gained inside cabinet 10 so that cabinet 10 can be unmounted from partition structure 12.

Figure 15:
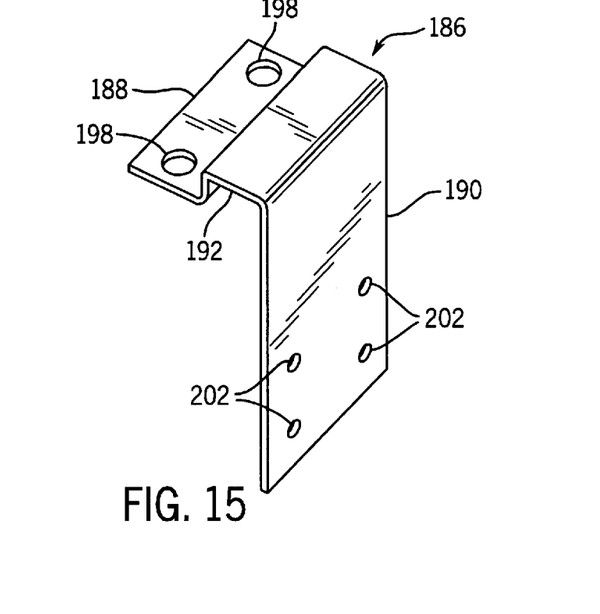
FIG. 15 is a perspective view of a second embodiment of a cabinet mounting bracket.
Figure 16:
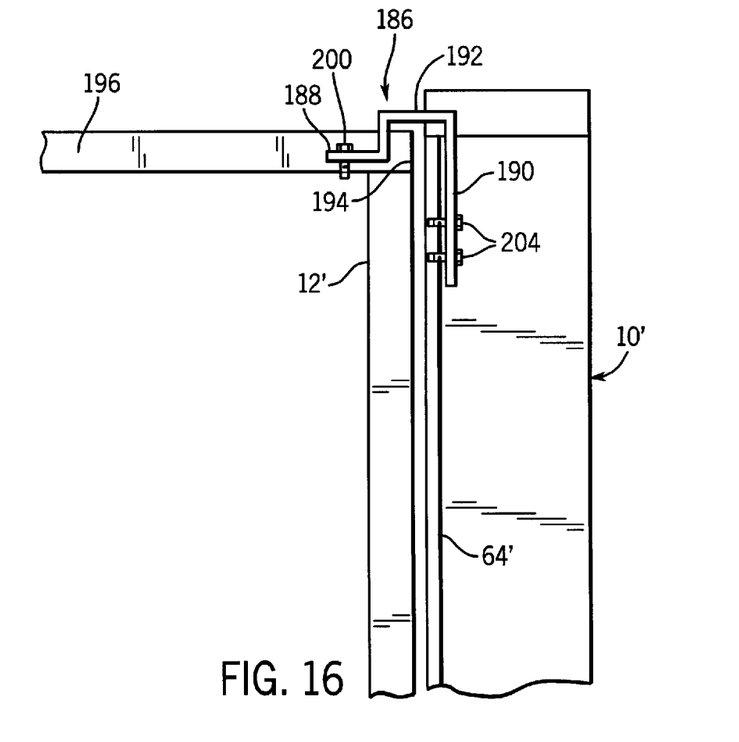
FIG. 16 is a side elevation schematic representation of the cabling consolidation point cabinet shown mounted by the bracket of FIG. 15 on the side of a single panel in the partition structure.

Referring now to FIGS. 15 and 16, an alternative mounting bracket 186 for a hanging cabinet 10' on the side of a single panel 12' is illustrated. Mounting bracket 186 comprises a bent metal plate including a horizontally extending base portion 188, a downwardly extending hanger portion 190, and an intermediate stepped portion 192. Stepped portion 192 allows bracket 186 to fit over a raised lip 194 which extends along the sides of an open top raceway 196 of panel 12'. Base portion 188 includes a pair of apertures 198 through which bolts 200 may be extended for securing bracket 186 to panel 12'. Hanger portion 190 includes a plurality of apertures 202 through which screws 204 (or alternatively, studs, bolts and nuts, etc.) may be extended for securing bracket 186 to back inner wall 64' of cabinet 10'. Screws 204 preferably terminate in a gap 82' provided in the back double wall of cabinet 10'. Cabinet 10' may be secured to panel 12' by a single centrally located mounting bracket 186 or, alternatively, by a pair of left and right mounting brackets 186.

Although the present invention has been described with reference to preferred embodiments, workers skilled in the art will recognize that changes may be made in form and detail without departing from the spirit and scope of the invention. For example, although bracket assemblies 24, 24' are only shown and described for mounting consolidation points 134 in vertical orientations, other orientations such as horizontal could readily be achieved. As another example, cable management elements such as dividers 26, 26' and power pole brackets 92 could be part of the weldment of body assembly 14 rather than being releasably attached as shown and described. Other examples could include the use of tabs and complementary slots (rather than apertures and sheet metal screws) for securing the cable management elements to stiffener 48 at interchangeable locations, and the use of a wire ring and push button mechanism (rather than a simple hole and pin) for locking CP mounting brackets 24, 24' in the desired orientations. These and other modifications are considered to form part of the invention, which is limited only by the scope of the claims which follow.

What is claimed is:

1. A communication cable management and distribution system for use in a modular partitioned workspace environment, comprising:
   a plurality of partition panels defining the workspace;
   a communication cabling consolidation point cabinet mounted on at least one of the panels adjacent a vertical surface thereof and at least partially supported by the panels; and
   a first mounting bracket attached to the at least one of the panels and the cabinet, the first mounting bracket including means for preventing the cabinet from being unmounted from the at least one of the panels except by gaining access to an interior of the cabinet.

2. The cable management and distribution system of claim 1, wherein the first mounting bracket includes a first column of tabs extending into and interlocked with slots formed in at least one vertical frame member of the at least one of the panels.

3. The cable management and distribution system of claim 1, further including a bracket assembly mounted in the interior of the cabinet for supporting a communication cabling consolidation point, wherein the bracket assembly includes a support bracket that is pivotable between at least two positions including a first position and a second position offering improved access to a front or a rear of the consolidation point.

4. The cable management and distribution system of claim 1, wherein at least one cable management element is mounted in said interior of the cabinet, the cabinet interior being defined by at least a back, a pair of sides and a front, and wherein the cabinet interior and the at least one cable management element are configured so that the at least one cable management element can be mounted at a plurality of interchangeable apertures in the cabinet interior.

5. The cable management and distribution system of claim 1, wherein the cabinet includes a back having double walls.

6. The cable management and distribution system of claim 5, wherein the double walls are provided by an outer shell and an inner stiffener.

7. The cable management and distribution system of claim 6, wherein the inner stiffener includes a vertically extending channel which defines a desired spacing between the inner stiffener and the outer shell.

8. The cable management and distribution system of claim 7, wherein the panels comprise rigid frames including vertical frame members, and wherein the cabinet is attached to at least one of the vertical frame members by the first mounting bracket secured to the double walls of the cabinet in the channel.

9. The cable management and distribution system of claim 5, wherein the cabinet includes at least one side having double walls.

10. The cable management and distribution system of claim 9, wherein the double walls are provided by an outer shell and an inner stiffener.

11. The cable management and distribution system of claim 5, further comprising cable management elements secured inside the cabinet by threaded fasteners terminating in a space formed within the double walls.

12. The cable management and distribution system of claim 6, wherein the double walls are part of a weldment.

13. The cable management and distribution system of claim 5, wherein the double walls of the cabinet include cutouts for allowing passage of cabling from the interior to the panels.

14. The cable management and distribution system of claim 1, wherein two of the panels have vertical edge members positioned adjacent one another to form a juncture, and wherein the cabinet is attached to the vertical edge members at the juncture.

15. The cable management and distribution system of claim 14, wherein the cabinet is attached to the vertical edge members by the first mounting bracket.

16. The cable management and distribution system of claim 14, wherein the cabinet is attached to the vertical edge members by the first mounting bracket and a second mounting bracket positioned below the first mounting bracket.

17. The cable management and distribution system of claim 1, wherein said at least one of the panels has a horizontal frame member extending along a top of said at least one of the panels, and wherein the cabinet is attached to the horizontal frame member by the first mounting bracket.

18. The cable management and distribution system of claim 1, wherein the cabinet has an open top covered by a removable top cap.

19. The cable management and distribution system of claim 1, wherein the cabinet has an open bottom and a removable base cover is vertically adjustable relative to the bottom of the cabinet.

20. The cable management and distribution system of claim 1, wherein the cabinet has an open front that includes at least one lockable door for restricting access into the cabinet.

21. The cable management and distribution system of claim 1, further including an electrical strain relief bracket adjacent a bottom of the cabinet.

22. A communication cable management and distribution system for use in a modular partitioned workspace environment, comprising:
    a plurality of partition panels defining the workspace;
    a communication cabling consolidation point cabinet mounted on a vertical face of at least one of the panels and supported by the panels; and
    a mounting bracket attached to at least one of the panels and the cabinet, the mounting bracket including means for preventing the cabinet from being unmounted from the at least one of the panels except by gaining internal access to the cabinet.

23. The cable management and distribution system of claim 22, wherein two of the panels have vertical edge members positioned adjacent one another to form a juncture, and wherein the cabinet is attached to the vertical edge members at the juncture.

24. The cable management and distribution system of claim 22, wherein the panels comprise rigid frames having vertical edge members, and wherein the cabinet is attached to a first one of the vertical edge members by the mounting bracket secured to a back wall of the cabinet and having a plurality of tabs extending into and interlocked with slots formed in the first one of the vertical edge members.

25. The cable management and distribution system of claim 24, wherein the mounting bracket includes a threaded stud extending through the back wall of the cabinet, and wherein a nut is threaded over the stud inside the cabinet.

26. The cable management and distribution system of claim 24, wherein the tabs comprise a first column of downwardly extending projections on the mounting bracket, and wherein an uppermost tab of said tabs of the mounting bracket includes an upwardly extending projection that prevents the mounting bracket from being removed from the slots except by tilting the mounting bracket at an angle relative to the first one of the vertical edge members.

27. The cable management and distribution system of claim 26, wherein the cabinet is attached to a second one of the vertical edge members by a second column of downwardly extending projections on the mounting bracket, and wherein the first and the second ones of the edge members form a junction between the panels.

28. A communication cable management and distribution system for use in a modular partitioned workspace environment, comprising;
    a plurality of partition panels defining the workspaces, the panels comprising rigid frames having vertical edge members, each of said vertical edge members including a vertical column of slots;
    a first mounting bracket including a first column of tabs extending into and interlocked with slots formed in a first one of the vertical edge members; and
    a communication cabling consolidation point cabinet attached to the first mounting bracket and at least partially supported by the panels;
    wherein each tab in the first column of tabs comprises a downwardly extending projection, and wherein an uppermost tab in the first color of tabs further comprises an upwardly extending projection that prevents the first mounting bracket from being removed from the slots except by tilting the first mounting bracket at an angle relative to the first one of the vertical edge members.

29. The cable management and distribution system of claim 28, wherein the first mounting bracket includes a second column of tabs extending into and interlocked with slots formed in a second one of the vertical edge members.

30. The cable management and distribution system of claim 28, further including a second mounting bracket including a third column of tabs extending into and interlocked with the slots formed in the first one of the vertical edge members, wherein the cabinet is attached to the second mounting bracket and at least partially supported by the panels, and wherein the second mounting bracket is located below the first mounting bracket.

31. A communication cable management and distribution system for use in a modular partitioned workspace environment, comprising:
    a plurality of partition panels defining the workspace;
    a communications cabling consolidation point cabinet mounted on at least one of the panels and at least partially supported by the panels; and
    a bracket assembly mounted in an interior of the cabinet for supporting a communication cabling consolidation point, wherein the bracket assembly includes a support bracket that is pivotable between at least two positions including a first position and a second position offering improved access to a front or a rear of the consolidation point.

32. The cable management and distribution system of claim 31, wherein the support bracket is pivotable to a third position for storage that is 180° opposite the first position for storage.

33. The cable management and distribution system of claim 32, wherein the support bracket is pivotable to a plurality of positions between the first and the third positions.

34. The cable management and distribution system of claim 31, wherein the bracket assembly includes means for locking the support bracket in the first or the second position.

35. The cable management and distribution system of claim 34, wherein the means for locking the support bracket in the first or the second position includes a first hole in the support bracket that aligns with a second hole in a stationary bracket member when the support bracket is in the first or the second position, and a pin which can be inserted through the aligned holes to lock the support bracket in position.

36. The cable management and distribution system of claim 31, wherein the support bracket comprises an elongated metal plate that is vertically oriented in the cabinet.

37. The cable management and distribution system of claim 31, wherein the bracket assembly further comprises a pair of end brackets attached to the internal wall of the cabinet and supporting the support bracket in rotation.

38. The cable management and distribution system of claim 37, wherein the support bracket includes an elongated central portion and a pair of perpendicularly extending legs, and wherein each of the end brackets includes a base attached to the internal wall of the cabinet and a perpendicularly extending arm pivotally connected to one of the legs.

39. The cable management and distribution system of claim 38, wherein one of the legs the support bracket includes a third hole that aligns with individual ones of a plurality of fourth holes in the pivotally connected arm when the support bracket is pivoted, whereby a pin can be inserted through the third hole and the one aligned fourth hole to lock the support bracket in position.

40. The cable management and distribution system of claim 39, wherein each of the pivotally connected arms and legs pivot around a pivot point, and wherein the plurality of fourth holes in the pivotally connected and are at radially equally spaced positions around the pivot point.

41. The cable management and distribution system of claim 39, wherein the plurality of fourth holes in the pivotally connected arm are coextensive with a semicircle of the pivot point opposite the base, whereby the support bracket has 180° of swivel.

42. The cable management and distribution system of claim 39, wherein the internal wall of the cabinet is a vertical back wall including a plurality of apertures arranged in rows, and wherein the bracket assembly is secured to the apertures.

43. A communication cable management and distribution system for use in a modular partitioned workspace environment, comprising:

a plurality of partition panels defining the workspace;

a communications cabling consolidation pit cabinet mounted on at least one of the panels and at least partially supported thereby, wherein the cabinet includes an interior defined in part by a back, a pair of sides and a front; and at least one cable management element mounted in the interior of the cabinet;

wherein the interior of the cabinet and the at least one cable management element are configured so that the at least one cable management element can be mounted at a plurality of interchangeable apertures in the interior of the cabinet; and wherein the cabinet includes double walls comprising an inner and an outer wall separated by a gap, the plurality of apertures being located in the inner wall and the at least one cable management element being secured to selected ones of said apertures in the inner wall by screws which terminate in the gap.

44. The cable management and distribution system of claim 43, wherein the interior of the cabinet and the at least one cable management element are further configured so that the at least one cable management element can be mounted in a plurality of orientations in the interior of the cabinet.

45. The cable management and distribution system of claim 43, wherein the apertures are formed in at least one of the back or one of the sides, and wherein the at least one cable management element can be releasably secured to selected ones of the apertures.

46. The cable management and distribution system of claim 45, wherein the plurality of apertures are arranged in a plurality of rows.

47. The cable management and distribution system of claim 46, wherein each row of said apertures extends in a vertical direction.

48. The cable management and distribution system of claim 45, wherein the at least one cable management element is a divider having a base and a upstanding arm, and wherein the base is attached to one of said apertures so that the arm of the divider can be swiveled to different orientations.

49. The cable management and distribution system of claim 48, wherein the base of the divider is secured to the one of said apertures by a screw.

50. The cable management and distribution system of claim 45, wherein the at least one cable management element is a divider having a base and an upstanding arm, and wherein the base is attached to at least two of said apertures and the arm includes a plurality of apertures for tying off and grouping communication cables.

51. The cable management and distribution system of claim 45, wherein the at least one cable management element is selected from the group consisting of a divider, a power pole mount, a consolidation point mount, and a strain relief mount.

52. The cable management and distribution system of claim 45, wherein the at least one cable management element is a power pole mount having an upper horizontal shoulder for bottoming out a power pole and a vertical flange for securing the power pole mount to one of the apertures.

53. The cable management and distribution system of claim 43, wherein the double walls form the back of the cabinet and the apertures are arranged in a plurality of rows along the back of the cabinet.

* * * * *